United States Patent
Kook et al.

(10) Patent No.: US 9,845,843 B2
(45) Date of Patent: Dec. 19, 2017

(54) PLANETARY GEAR TRAIN OF AUTOMATIC TRANSMISSION FOR VEHICLE

(71) Applicant: Hyundai Motor Company, Seoul (KR)

(72) Inventors: Jae Chang Kook, Hwaseong-si (KR); Hyun Sik Kwon, Seoul (KR); Seongwook Ji, Ansan-si (KR); Wonmin Cho, Hwaseong-si (KR); Wookjin Jang, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/191,310

(22) Filed: Jun. 23, 2016

(65) Prior Publication Data
US 2017/0159763 A1  Jun. 8, 2017

(30) Foreign Application Priority Data

Dec. 2, 2015 (KR) ........................ 10-2015-0170985

(51) Int. Cl.
*F16H 3/66* (2006.01)
*F16H 3/62* (2006.01)
*F16H 3/44* (2006.01)

(52) U.S. Cl.
CPC ......... *F16H 3/66* (2013.01); *F16H 2003/445* (2013.01); *F16H 2200/006* (2013.01); *F16H 2200/201* (2013.01); *F16H 2200/2046* (2013.01); *F16H 2200/2097* (2013.01)

(58) Field of Classification Search
CPC ................. F16H 3/66; F16H 2200/006; F16H 2200/201; F16H 2200/2097; F16H 2200/2046; F16H 3/62
See application file for complete search history.

(56) References Cited

U.S. PATENT DOCUMENTS

| | | | | |
|---|---|---|---|---|
| 6,846,263 B2 * | 1/2005 | Lee | ........................... | F16H 3/66 475/280 |
| 7,066,861 B2 * | 6/2006 | Bucknor | ................... | F16H 3/66 475/275 |
| 7,086,986 B2 * | 8/2006 | Raghavan | ................. | F16H 3/66 475/279 |

(Continued)

FOREIGN PATENT DOCUMENTS

| | | |
|---|---|---|
| JP | 2012-007665 A | 1/2012 |
| JP | 2012-13209 A | 1/2012 |
| WO | WO 2013/088568 A1 | 6/2013 |

*Primary Examiner* — Jacob S Scott
*Assistant Examiner* — Tinh Dang
(74) *Attorney, Agent, or Firm* — Morgan, Lewis & Bockius LLP

(57) ABSTRACT

A planetary gear set of an automatic transmission for a vehicle may include an input shaft, an output shaft, a first planetary gear set including first, second, and third rotational elements, a second planetary gear set including fourth, fifth, and sixth rotational elements, a third planetary gear set including seventh, eighth, and ninth rotational elements, six control elements for selectively interconnecting the rotational elements, a first connecting member, a second connecting member, a third connecting member, a fourth connecting member, a fifth connecting member, a sixth connecting member, and a seventh connecting member.

10 Claims, 2 Drawing Sheets

| Shift-stage | Control element | | | | | | Gear ratio |
|---|---|---|---|---|---|---|---|
| | C1 | C2 | C3 | C4 | C5 | C6 | |
| D1 | | ● | | ● | | ● | 3.167 |
| D2 | | ● | | ● | ● | | 1.667 |
| D3 | | ● | | | ● | ● | 1.121 |
| D4 | | ● | ● | | ● | | 1.089 |
| D5 | | ● | ● | | | ● | 1.000 |
| D6 | ● | ● | | | | ● | 0.833 |
| D7 | ● | | ● | | | ● | 0.667 |
| D8 | ● | | | | ● | ● | 0.545 |
| REV | ● | | | ● | | ● | 1.500 |

(56) References Cited

U.S. PATENT DOCUMENTS

| | | | | |
|---|---|---|---|---|
| 7,186,204 B2* | 3/2007 | Gumpoltsberger | ..... | F16H 3/666 475/275 |
| 7,226,382 B2* | 6/2007 | Bucknor | .................. | F16H 3/66 475/275 |
| 7,766,782 B2* | 8/2010 | Wittkopp | ................ | F16H 3/666 475/275 |
| 8,062,164 B2* | 11/2011 | Boss | ........................ | F16H 3/66 475/275 |
| 8,414,444 B2 | 4/2013 | Seo et al. | | |
| 8,475,322 B2* | 7/2013 | Aota | ...................... | F16H 3/666 475/275 |
| 9,651,117 B2* | 5/2017 | Cho | ......................... | F16H 3/66 |

\* cited by examiner

FIG. 2

| Shift-stage | Control element | | | | | | Gear ratio |
|---|---|---|---|---|---|---|---|
| | C1 | C2 | C3 | C4 | C5 | C6 | |
| D1 | | ● | | ● | | ● | 3.167 |
| D2 | | ● | | ● | ● | | 1.667 |
| D3 | | ● | | | ● | ● | 1.121 |
| D4 | | ● | ● | | ● | | 1.089 |
| D5 | | ● | ● | | | ● | 1.000 |
| D6 | ● | ● | | | | ● | 0.833 |
| D7 | ● | | ● | | | ● | 0.667 |
| D8 | ● | | | | ● | ● | 0.545 |
| REV | ● | | | ● | | ● | 1.500 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0170985, filed Dec. 2, 2015, the entire contents of which is incorporated herein for all purposes by this reference.

BACKGROUND OF THE INVENTION

Field of the Invention

The present invention relates to an automatic transmission for a vehicle.

Description of Related Art

The recent increase in oil prices has caused car makers to meet global demands for improving fuel efficiency.

In this sense, research is being conducted on engines in terms of reducing weight and improving fuel efficiency by down-sizing, and research is also being conducted to ensure both drivability and competitiveness for maximizing fuel efficiency by implementing an automatic transmission with multiple speed stages.

In order to achieve more shift stages for an automatic transmission, the number of internal components is generally increased as the number of gear shift stages is increased, and as a result, the automatic transmission may be difficult to mount, the manufacturing cost and weight may be increased, and power transmission efficiency may be deteriorated.

Therefore, in order to maximally enhance fuel consumption of an automatic transmission having more shift stages, it is important for better efficiency to be derived by a smaller number of parts.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of, by minimal complexity, realizing at least forward eighth speeds and at least one reverse speed, thereby improving power delivery performance and fuel consumption due to multi-stages, and improving driving stability of a vehicle by utilizing a low rotation speed of an engine.

According to various aspects of the present invention, a planetary gear set of an automatic transmission for a vehicle may include an input shaft for receiving an engine torque, an output shaft for outputting a shifted torque of the engine, a first planetary gear set including first, second, and third rotational elements, a second planetary gear set including fourth, fifth, and sixth rotational elements, a third planetary gear set including seventh, eighth, and ninth rotational elements, six control elements for selectively interconnecting the rotational elements, a first connecting member connected with the first rotational element and the fifth rotational element, and selectively connected with the input shaft, a second connecting member connected with the second rotational element, a third connecting member connected with the third rotational element and the eighth rotational element and directly connected with the output shaft, a fourth connecting member connected with the fourth rotational element, directly connected with the transmission housing, and selectively connected with the second connecting member, a fifth connecting member connected with the sixth rotational element, a sixth connecting member connected with the seventh rotational element and selectively connected with the third connecting member and the fifth connecting member, and a seventh connecting member connected with the ninth rotational element and selectively connected with the input shaft.

The first planetary gear set may be a single pinion planetary gear set, where the first rotational element is a first sun gear, the second rotational element is a first planet carrier, and the third rotational element is a first ring gear, the second planetary gear set may be a single pinion planetary gear set, where the fourth rotational element is a second sun gear, the fifth rotational element is a second planet carrier, and the sixth rotational element is a second ring gear, and the third planetary gear set may be a single pinion planetary gear set, where the seventh rotational element is a third sun gear, the eighth rotational element is a third planet carrier, and the ninth rotational element is a third ring gear.

The six control elements may include a first clutch selectively connecting the input shaft and the first connecting member, a second clutch selectively connecting the input shaft and the seventh connecting member, a third clutch selectively connecting the third connecting member and the fifth connecting member, a fourth clutch selectively connecting the second connecting member and the fourth connecting member, a fifth clutch selectively connecting the second connecting member and the seventh connecting member, and a sixth clutch selectively connecting the fifth connecting member and the sixth connecting member.

Shift stages realized by selective operation of three control elements among the six control elements may include a forward first speed formed by simultaneous operation of the second, fourth, and sixth clutches, a forward second speed formed by simultaneous operation of the second, fourth, and fifth clutches, a forward third speed formed by simultaneous operation of the second, fifth, and sixth clutches, a forward fourth speed formed by simultaneous operation of the second, third, and fifth clutches, a forward fifth speed formed by simultaneous operation of the second, third, and sixth clutches, a forward sixth speed formed by simultaneous operation of the first, second, and sixth clutches, a forward seventh speed formed by simultaneous operation of the first, third, and sixth clutches, a forward eighth speed formed by simultaneous operation of the first, fifth, and sixth clutches, and a reverse speed formed by simultaneous operation of the first, fourth, and sixth clutches.

According to various aspects of the present invention, a planetary gear set of an automatic transmission for a vehicle may include an input shaft for receiving an engine torque, an output shaft for outputting a shifted torque of the engine, a first planetary gear set including first, second, and third rotational elements, a second planetary gear set including fourth, fifth, and sixth rotational elements, a third planetary gear set including seventh, eighth, and ninth rotational elements, a first connecting member connected with the first rotational element and the fifth rotational element, and selectively connected with the input shaft, a second connecting member connected with the second rotational element, a third connecting member connected with the third rotational element and the eighth rotational element and directly connected with the output shaft, a fourth connecting member connected with the fourth rotational element, directly connected with the transmission housing, and selectively connected with the second connecting member, a fifth connecting member connected with the sixth rotational element, a sixth connecting member connected with the seventh rotational element and selectively connected with the third connecting member and the fifth connecting member, a seventh connecting member connected with the ninth rotational element and selectively connected with the input shaft, a first clutch selectively connecting the input shaft and the first connecting member, a second clutch selectively connecting the input shaft and the seventh connecting member, a third clutch selectively connecting the third connecting member and the fifth connecting member, a fourth clutch selectively connecting the second connecting member and the fourth connecting member, a fifth clutch selectively connecting the second connecting member and the seventh connecting member, and a sixth clutch selectively connecting the fifth connecting member and the sixth connecting member.

The first planetary gear set may be a single pinion planetary gear set, where the first rotational element is a first sun gear, the second rotational element is a first planet carrier, and the third rotational element is a first ring gear, the second planetary gear set is a single pinion planetary gear set, where the fourth rotational element is a second sun gear, the fifth rotational element is a second planet carrier, and the sixth rotational element is a second ring gear, and the third planetary gear set is a single pinion planetary gear set, where the seventh rotational element is a third sun gear, the eighth rotational element is a third planet carrier, and the ninth rotational element is a third ring gear.

According to various aspects of the present invention, a planetary gear set of an automatic transmission for a vehicle may include an input shaft for receiving an engine torque, an output shaft for outputting a shifted torque of the engine, a first planetary gear set as a single pinion planetary gear set including a first sun gear, a first planet carrier, and a first ring gear, a second planetary gear set as a single pinion planetary gear set including a second sun gear, a second planet carrier, and a second ring gear, a third planetary gear set as a single pinion planetary gear set including a third sun gear, a third planet carrier, and a third ring gear, a first connecting member connected with the first sun gear and the second planet carrier, and selectively connected with the input shaft, a second connecting member connected with the first planet carrier, a third connecting member connected with the first ring gear and the third planet carrier, and directly connected with the output shaft, a fourth connecting member connected with the second sun gear, directly connected with the transmission housing, and selectively connected with the second connecting member, a fifth connecting member connected with the second ring gear, a sixth connecting member connected with the third sun gear and selectively connected with the third connecting member and the fifth connecting member, a seventh connecting member connected with the third ring gear, and selectively connected with the input shaft, and six control elements interconnecting the connecting members.

A planetary gear train according to various embodiments of the present invention may realize at least eight forward speeds and at least one reverse speed formed by operating the three planetary gear sets as simple planetary gear sets by controlling six control elements.

In addition, a planetary gear train according to various embodiments of the present invention may substantially improve driving stability by realizing shift stages appropriate for rotation speed of an engine due to multiple speed stages of an automatic transmission.

In addition, a planetary gear train according to various embodiments of the present invention may maximize engine driving efficiency by providing an automatic transmission capable of achieving multiple speed stages, and may improve power delivery performance and fuel consumption.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift stages in the exemplary planetary gear train according to the present invention.

Figure 1:
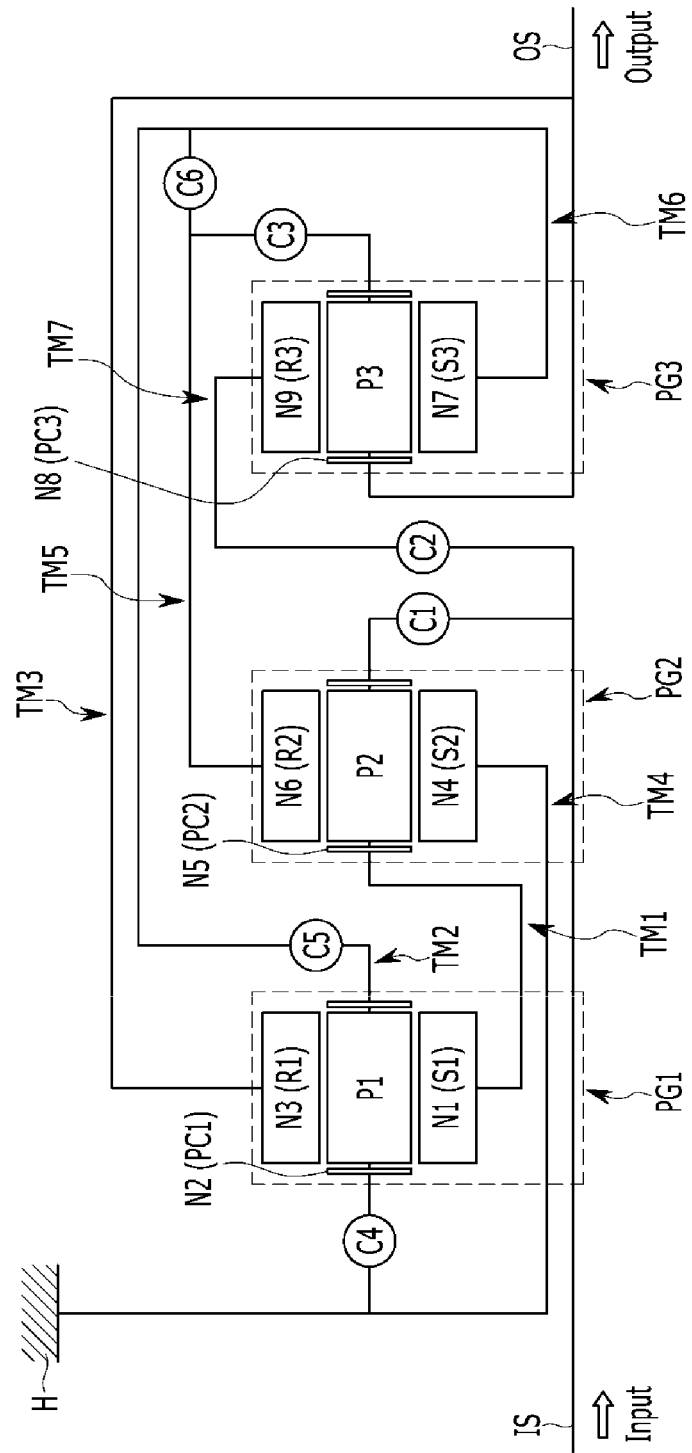
FIG. 1 is a schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention. Referring to FIG. 1, a planetary gear train according to various embodiments of the present invention includes first, second, and third planetary gear sets PG1, PG2, and PG3 arranged on a same axis, an input shaft IS, an output shaft OS, seven connecting members TM1 to TM7 of respective rotational elements of the first, second, and third planetary gear sets PG1, PG2, and PG3, six control elements C1 to C6, and a transmission housing H.

Torque input from the input shaft IS is shifted by cooperative operation of the first, second, and third planetary gear sets PG1, PG2, and PG3, and then output through the output shaft OS.

The simple planetary gear sets are arranged in the order of first, first, second, and third planetary gear sets PG1, PG2, and PG3, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus.

The first planetary gear set PG1 is a single pinion planetary gear set, and includes a first sun gear S1, a first planet carrier PC1 that supports a first pinion P1 externally engaged with the first sun gear S1, and a first ring gear R1 internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports a second pinion P2 externally engaged with the second sun gear S2, and a second ring gear R2 internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports a third pinion P3 externally engaged with the third sun gear S3, and a third ring gear R3 internally engaged with the third pinion P3. The third sun gear S3 acts as a seventh rotational element N7, the third planet carrier PC3 acts as an eighth rotational element N8, and the third ring gear R3 acts as a ninth rotational element N9.

In the arrangement of the first, second, and third planetary gear sets PG1, PG2, and PG3, the first rotational element N1 is directly connected with the fifth rotational element N5, the third rotational element N3 is directly connected with the eighth rotational element N8, by seven connecting members TM1 to TM7.

The seven connecting members TM1 to TM7 are arranged as follows.

The first connecting member TM1 is connected with the first rotational element N1 (first sun gear S1) and the fifth rotational element N5 (second planet carrier PC2), and selectively connected with the input shaft IS.

The second connecting member TM2 is connected with second rotational element N2 (first planet carrier PC1).

The third connecting member TM3 is connected with the third rotational element N3 (first ring gear R1) and the eighth rotational element N8 (third planet carrier PC3), and directly connected with the output shaft OS.

The fourth connecting member TM4 is connected with the fourth rotational element N4 (second sun gear S2), directly connected with the transmission housing H, and selectively connected with the second connecting member TM2.

The fifth connecting member TM5 is connected with the sixth rotational element N6 (second ring gear R2), and selectively connected with the third connecting member TM3.

The sixth connecting member TM6 is connected with the seventh rotational element N7 (third sun gear S3), and selectively connected with the second connecting member TM2 and the fifth connecting member TM5.

The seventh connecting member TM7 is connected with the ninth rotational element N9 (third ring gear R3), and selectively connected with the input shaft IS.

The connecting members TM1 to TM7 may be selectively interconnected with one another by control elements of six clutches C1, C2, C3, C4, C5, and C6.

The six control elements C1 to C6 are arranged as follows.

The first clutch C1 is arranged between the input shaft IS and the first connecting member TM1, such that the input shaft IS and the first connecting member TM1 may selectively become integral.

The second clutch C2 is arranged between the input shaft IS and the seventh connecting member TM7, such that the input shaft IS and the seventh connecting member TM7 may selectively become integral.

The third clutch C3 is arranged between the third connecting member TM3 and the fifth connecting member TM5, such that the third connecting member TM3 and the fifth connecting member TM5 may selectively become integral.

The fourth clutch C4 is arranged between the second connecting member TM2 and the fourth connecting member TM4, such that the second connecting member TM2 and the fourth connecting member TM4 may selectively become integral.

The fifth clutch C5 is arranged between the second connecting member TM2 and the sixth connecting member TM6, such that the second connecting member TM2 and the sixth connecting member TM6 may selectively become integral.

The sixth clutch C6 is arranged between the fifth connecting member TM5 and the sixth connecting member TM6, such that the fifth connecting member TM5 and the sixth connecting member TM6 may selectively become integral.

Respective control elements of the first, second, third, fourth, fifth, and sixth clutches C1, C2, C3, C4, C5, and C6 may be realized as multi-plate hydraulic pressure friction devices that are frictionally engaged by hydraulic pressure.

FIG. 2 is an operational chart for respective control elements at respective shift stages in a planetary gear train according to various embodiments of the present invention. As shown in FIG. 2, a planetary gear train according to various embodiments of the present invention performs shifting by operating three control elements at respective shift stages.

In the forward first speed shift stage D1, the second, fourth, and sixth clutches C2, C4, and C6 are simultaneously operated. As a result, the input shaft IS and the seventh connecting member TM7 are interconnected by the operation of the second clutch C2, and the second connecting member TM2 and the fourth connecting member TM4 are interconnected by the operation of the fourth clutch C4, and the fifth connecting member TM5 and the sixth connecting member TM6 are interconnected by the operation of the sixth clutch C6. In this state, torque is input to the seventh connecting member TM7. In addition, the fourth connecting member TM4 acts as a fixed element, and the second connecting member TM2 simultaneously acts as a fixed element by the operation of the fourth clutch C4, thereby realizing the forward first speed and outputting a shifted torque to the output shaft OS through the third connecting member TM3.

In the forward second speed shift stage D2, the second, fourth, and fifth clutches C2, C4, and C5 are simultaneously operated. As a result, the input shaft IS and the seventh connecting member TM7 are interconnected by the operation of the second clutch C2, and the second connecting member TM2 and the fourth connecting member TM4 are interconnected by the operation of the fourth clutch C4, and the second connecting member TM2 and the sixth connecting member TM6 are interconnected by the operation of the fifth clutch C5. In this state, torque is input to the seventh connecting member TM7. In addition, the fourth connecting member TM4 acts as a fixed element, and the second connecting member TM2 simultaneously acts as a fixed element by the operation of the fourth clutch C4, thereby realizing the forward second speed and outputting a shifted torque to the output shaft OS through the third connecting member TM3.

In the forward third speed shift stage D3, the second, fifth, and sixth clutches C2, C5, and C6 are simultaneously operated. As a result, the input shaft IS and the seventh connecting member TM7 are interconnected by the operation of the second clutch C2, and the second connecting member TM2 and the sixth connecting member TM6 are interconnected by the operation of the fifth clutch C5, and the fifth connecting member TM5 and the sixth connecting member TM6 are interconnected by the operation of the sixth clutch C6. In this state, torque is input to the seventh connecting member TM7. In addition, the fourth connecting member TM4 acts as a fixed element, thereby realizing the forward third speed and outputting a shifted torque to the output shaft OS through the third connecting member TM3.

In the forward fourth speed shift stage D4, the second, third, and fifth clutches C2, C3, and C5 are simultaneously operated. As a result, the input shaft IS and the seventh connecting member TM7 are interconnected by the operation of the second clutch C2, and the third connecting member TM3 and the fifth connecting member TM5 are interconnected by the operation of the third clutch C3, and the second connecting member TM2 and the sixth connecting member TM6 are interconnected by the operation of the fifth clutch C5. In this state, torque is input to the seventh connecting member TM7. In addition, the fourth connecting member TM4 acts as a fixed element, thereby realizing the forward fourth speed and outputting a shifted torque to the output shaft OS through the third connecting member TM3.

In the forward fifth speed shift stage D5, the second, third, and sixth clutches C2, C3, and C6 are simultaneously operated. As a result, the input shaft IS and the seventh connecting member TM7 are interconnected by the operation of the second clutch C2, and the third connecting member TM3 and the fifth connecting member TM5 are interconnected by the operation of the third clutch C3, and the fifth connecting member TM5 and the sixth connecting member TM6 are interconnected by the operation of the sixth clutch C6. In this state, torque is input to the seventh connecting member TM7. In addition, the fourth connecting member TM4 acts as a fixed element, thereby realizing the forward fifth speed that outputs a torque as input, and outputs the input torque to the output shaft OS through the third connecting member TM3.

In the forward sixth speed shift stage D6, the first, second, and sixth clutches C1, C2, and C6 are simultaneously operated. As a result, the input shaft IS and the first connecting member TM1 are interconnected by the operation of the first clutch C1, and the input shaft IS and the seventh connecting member TM7 are interconnected by the operation of the second clutch C2, and the fifth connecting member TM5 and the sixth connecting member TM6 are interconnected by the operation of the sixth clutch C6. In this state, torque is input to the first and seventh connecting members TM1 and TM7. In addition, the fourth connecting member TM4 acts as a fixed element, thereby realizing the forward sixth speed and outputting a shifted torque to the output shaft OS through the third connecting member TM3.

In the forward seventh speed shift stage D7, the first, third, and sixth clutches C1, C3, and C6 are simultaneously operated. As a result, the input shaft IS and the first connecting member TM1 are interconnected by the operation of the first clutch C1, and the third connecting member TM3 and the fifth connecting member TM5 are interconnected by the operation of the third clutch C3, and the fifth connecting member TM5 and the sixth connecting member TM6 are interconnected by the operation of the sixth clutch C6. In this state, torque is input to the first connecting member TM1. In addition, the fourth connecting member TM4 acts as a fixed element, thereby realizing the forward seventh speed and outputting a shifted torque to the output shaft OS through the third connecting member TM3.

In the forward eighth speed shift stage D8, the first, fifth, and sixth clutches C1, C5, and C6 are simultaneously operated. As a result, the input shaft IS and the first connecting member TM1 are interconnected by the operation of the first clutch C1, and the second connecting member TM2 and the sixth connecting member TM6 are interconnected by the operation of the fifth clutch C5, and the fifth connecting member TM5 and the sixth connecting member TM6 are interconnected by the operation of the sixth clutch C6. In this state, torque is input to the first connecting member TM1. In addition, the fourth connecting member TM4 acts as a fixed element, thereby realizing the forward eighth speed and outputting a shifted torque to the output shaft OS through the third connecting member TM3.

In the reverse speed REV, the first, fourth, and sixth clutches C1, C4, and C6 are simultaneously operated. As a result, the input shaft IS and the first connecting member TM1 are interconnected by the operation of the first clutch C1, and the second connecting member TM2 and the fourth connecting member TM4 are interconnected by the operation of the fourth clutch C4, and the fifth connecting member TM5 and the sixth connecting member TM6 are interconnected by the operation of the sixth clutch C6. In this state, torque is input to the first connecting member TM1. In addition, the fourth connecting member TM4 acts as a fixed element, and the second connecting member TM2 simultaneously acts as a fixed element by the operation of the fourth clutch C4, thereby realizing the reverse speed and outputting a shifted torque to the output shaft OS through the third connecting member TM3.

As described above, a planetary gear train according to various embodiments of the present invention may realize at least eight forward speeds and at least one reverse speed formed by operating three planetary gear sets PG1, PG2, and PG3 by controlling six clutches C1, C2, C3, C4, C5, and C6.

In addition, a planetary gear train according to various embodiments of the present invention may substantially improve driving stability by realizing shift stages appropriate for rotation speed of an engine due to multiple speed stages of an automatic transmission.

In addition, a planetary gear train according to various embodiments of the present invention may maximize engine driving efficiency by providing an automatic transmission capable of achieving multiple speed stages of an automatic transmission, and may improve power delivery performance and fuel consumption.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear set of an automatic transmission for a vehicle, comprising:
   an input shaft for receiving an engine torque;
   an output shaft for outputting a shifted torque of the engine;
   a first planetary gear set including first, second, and third rotational elements;
   a second planetary gear set including fourth, fifth, and sixth rotational elements;
   a third planetary gear set including seventh, eighth, and ninth rotational elements;
   six control elements for selectively interconnecting the rotational elements;
   a first connecting member connected with the first rotational element and the fifth rotational element, and selectively connected with the input shaft;
   a second connecting member connected with the second rotational element;
   a third connecting member connected with the third rotational element and the eighth rotational element and directly connected with the output shaft;
   a fourth connecting member connected with the fourth rotational element, directly connected with a transmission housing, and selectively connected with the second connecting member;
   a fifth connecting member connected with the sixth rotational element;
   a sixth connecting member connected with the seventh rotational element and selectively connected with the third connecting member and the fifth connecting member; and
   a seventh connecting member connected with the ninth rotational element and selectively connected with the input shaft.

2. The planetary gear set of claim 1, wherein:
   the first planetary gear set is a single pinion planetary gear set, where the first rotational element is a first sun gear, the second rotational element is a first planet carrier, and the third rotational element is a first ring gear;
   the second planetary gear set is a single pinion planetary gear set, where the fourth rotational element is a second sun gear, the fifth rotational element is a second planet carrier, and the sixth rotational element is a second ring gear; and
   the third planetary gear set is a single pinion planetary gear set, where the seventh rotational element is a third sun gear, the eighth rotational element is a third planet carrier, and the ninth rotational element is a third ring gear.

3. The planetary gear set of claim 1, wherein the six control elements comprise:
   a first clutch selectively connecting the input shaft and the first connecting member;
   a second clutch selectively connecting the input shaft and the seventh connecting member;
   a third clutch selectively connecting the third connecting member and the fifth connecting member;
   a fourth clutch selectively connecting the second connecting member and the fourth connecting member;
   a fifth clutch selectively connecting the second connecting member and the seventh connecting member; and
   a sixth clutch selectively connecting the fifth connecting member and the sixth connecting member.

4. The planetary gear set of claim 3, wherein shift stages realized by selective operation of three control elements among the six control elements comprise:
   a forward first speed formed by simultaneous operation of the second, fourth, and sixth clutches;
   a forward second speed formed by simultaneous operation of the second, fourth, and fifth clutches;
   a forward third speed formed by simultaneous operation of the second, fifth, and sixth clutches;
   a forward fourth speed formed by simultaneous operation of the second, third, and fifth clutches;
   a forward fifth speed formed by simultaneous operation of the second, third, and sixth clutches;
   a forward sixth speed formed by simultaneous operation of the first, second, and sixth clutches;
   a forward seventh speed formed by simultaneous operation of the first, third, and sixth clutches;
   a forward eighth speed formed by simultaneous operation of the first, fifth, and sixth clutches; and
   a reverse speed formed by simultaneous operation of the first, fourth, and sixth clutches.

5. A planetary gear set of an automatic transmission for a vehicle, comprising:
   an input shaft for receiving an engine torque;
   an output shaft for outputting a shifted torque of the engine;
   a first planetary gear set including first, second, and third rotational elements;
   a second planetary gear set including fourth, fifth, and sixth rotational elements;
   a third planetary gear set including seventh, eighth, and ninth rotational elements;
   a first connecting member connected with the first rotational element and the fifth rotational element, and selectively connected with the input shaft;
   a second connecting member connected with the second rotational element;
   a third connecting member connected with the third rotational element and the eighth rotational element and directly connected with the output shaft;
   a fourth connecting member connected with the fourth rotational element, directly connected with a transmission housing, and selectively connected with the second connecting member;
   a fifth connecting member connected with the sixth rotational element;
   a sixth connecting member connected with the seventh rotational element and selectively connected with the third connecting member and the fifth connecting member;
   a seventh connecting member connected with the ninth rotational element and selectively connected with the input shaft;

a first clutch selectively connecting the input shaft and the first connecting member;
a second clutch selectively connecting the input shaft and the seventh connecting member;
a third clutch selectively connecting the third connecting member and the fifth connecting member;
a fourth clutch selectively connecting the second connecting member and the fourth connecting member;
a fifth clutch selectively connecting the second connecting member and the seventh connecting member; and
a sixth clutch selectively connecting the fifth connecting member and the sixth connecting member.

6. The planetary gear set of claim 5, wherein:
the first planetary gear set is a single pinion planetary gear set, where the first rotational element is a first sun gear, the second rotational element is a first planet carrier, and the third rotational element is a first ring gear;
the second planetary gear set is a single pinion planetary gear set, where the fourth rotational element is a second sun gear, the fifth rotational element is a second planet carrier, and the sixth rotational element is a second ring gear; and
the third planetary gear set is a single pinion planetary gear set, where the seventh rotational element is a third sun gear, the eighth rotational element is a third planet carrier, and the ninth rotational element is a third ring gear.

7. The planetary gear set of claim 5, wherein shift stages realized by selective operation of three control elements among the control elements of the six clutch comprise:
a forward first speed formed by simultaneous operation of the second, fourth, and sixth clutches;
a forward second speed formed by simultaneous operation of the second, fourth, and fifth clutches;
a forward third speed formed by simultaneous operation of the second, fifth, and sixth clutches;
a forward fourth speed formed by simultaneous operation of the second, third, and fifth clutches;
a forward fifth speed formed by simultaneous operation of the second, third, and sixth clutches;
a forward sixth speed formed by simultaneous operation of the first, second, and sixth clutches;
a forward seventh speed formed by simultaneous operation of the first, third, and sixth clutches;
a forward eighth speed formed by simultaneous operation of the first, fifth, and sixth clutches; and
a reverse speed formed by simultaneous operation of the first, fourth, and sixth clutches.

8. A planetary gear set of an automatic transmission for a vehicle, comprising:
an input shaft for receiving an engine torque;
an output shaft for outputting a shifted torque of the engine;
a first planetary gear set as a single pinion planetary gear set including a first sun gear, a first planet carrier, and a first ring gear;
a second planetary gear set as a single pinion planetary gear set including a second sun gear, a second planet carrier, and a second ring gear;
a third planetary gear set as a single pinion planetary gear set including a third sun gear, a third planet carrier, and a third ring gear;
a first connecting member connected with the first sun gear and the second planet carrier, and selectively connected with the input shaft;
a second connecting member connected with the first planet carrier;
a third connecting member connected with the first ring gear and the third planet carrier, and directly connected with the output shaft;
a fourth connecting member connected with the second sun gear, directly connected with a transmission housing, and selectively connected with the second connecting member;
a fifth connecting member connected with the second ring gear;
a sixth connecting member connected with the third sun gear and selectively connected with the third connecting member and the fifth connecting member;
a seventh connecting member connected with the third ring gear, and selectively connected with the input shaft; and
six control elements interconnecting the connecting members.

9. The planetary gear set of claim 8, wherein the six control elements comprise:
a first clutch selectively connecting the input shaft and the first connecting member;
a second clutch selectively connecting the input shaft and the seventh connecting member;
a third clutch selectively connecting the third connecting member and the fifth connecting member;
a fourth clutch selectively connecting the second connecting member and the fourth connecting member;
a fifth clutch selectively connecting the second connecting member and the seventh connecting member; and
a sixth clutch selectively connecting the fifth connecting member and the sixth connecting member.

10. The planetary gear set of claim 9, wherein shift stages realized by selective operation of three control elements among the six control elements comprise:
a forward first speed formed by simultaneous operation of the second, fourth, and sixth clutches;
a forward second speed formed by simultaneous operation of the second, fourth, and fifth clutches;
a forward third speed formed by simultaneous operation of the second, fifth, and sixth clutches;
a forward fourth speed formed by simultaneous operation of the second, third, and fifth clutches;
a forward fifth speed formed by simultaneous operation of the second, third, and sixth clutches;
a forward sixth speed formed by simultaneous operation of the first, second, and sixth clutches;
a forward seventh speed formed by simultaneous operation of the first, third, and sixth clutches;
a forward eighth speed formed by simultaneous operation of the first, fifth, and sixth clutches; and
a reverse speed formed by simultaneous operation of the first, fourth, and sixth clutches.

* * * * *